(12) United States Patent
Wiest

(10) Patent No.: US 7,025,295 B2
(45) Date of Patent: Apr. 11, 2006

(54) FISHING REEL WITH UNIFORM OSCILLATION SYSTEM

(75) Inventor: Timothy A. Wiest, Hegins, PA (US)

(73) Assignee: Penn Fishing Tackle Manufacturing Co.

( * ) Notice: Subject to any disclaimer, the term of this patent is extended or adjusted under 35 U.S.C. 154(b) by 49 days.

(21) Appl. No.: 10/973,785

(22) Filed: Oct. 25, 2004

(65) Prior Publication Data

US 2005/0056714 A1 Mar. 17, 2005

Related U.S. Application Data

(63) Continuation of application No. 10/302,637, filed on Nov. 21, 2002, now abandoned.

(60) Provisional application No. 60/343,441, filed on Dec. 31, 2001.

(51) Int. Cl.
*A01K 89/01* (2006.01)
(52) U.S. Cl. .................................................. 242/242
(58) Field of Classification Search ................ 242/242, 242/FOR. 242
See application file for complete search history.

(56) References Cited

U.S. PATENT DOCUMENTS

| 562,086 | A | * | 6/1896 | Livingstone | 74/50 |
| 2,528,386 | A | * | 10/1950 | Napper | 74/55 |
| 5,350,131 | A | * | 9/1994 | Baumgartner et al. | 242/242 |
| 5,513,814 | A | * | 5/1996 | Zanon | 242/241 |
| 5,921,489 | A | * | 7/1999 | Shibata | 242/242 |
| 6,170,773 | B1 | * | 1/2001 | Okada | 242/242 |
| 6,264,125 | B1 | * | 7/2001 | Cockerham et al. | 242/242 |
| 6,394,379 | B1 | * | 5/2002 | Ivie | 242/242 |
| 6,655,620 | B1 | * | 12/2003 | Huat | 242/242 |

* cited by examiner

*Primary Examiner*—Kathy Matecki
*Assistant Examiner*—E. Langdon
(74) *Attorney, Agent, or Firm*—Frank J. Benasutti

(57) ABSTRACT

A spinning reel has a level wind system wherein a slot is formed in the crosswind block. A lobe is carried on a crosswind gear. The surfaces of the lobe interact with the surfaces in the block. There are three curved surfaces on the lobe and four working surfaces in the block.

37 Claims, 18 Drawing Sheets

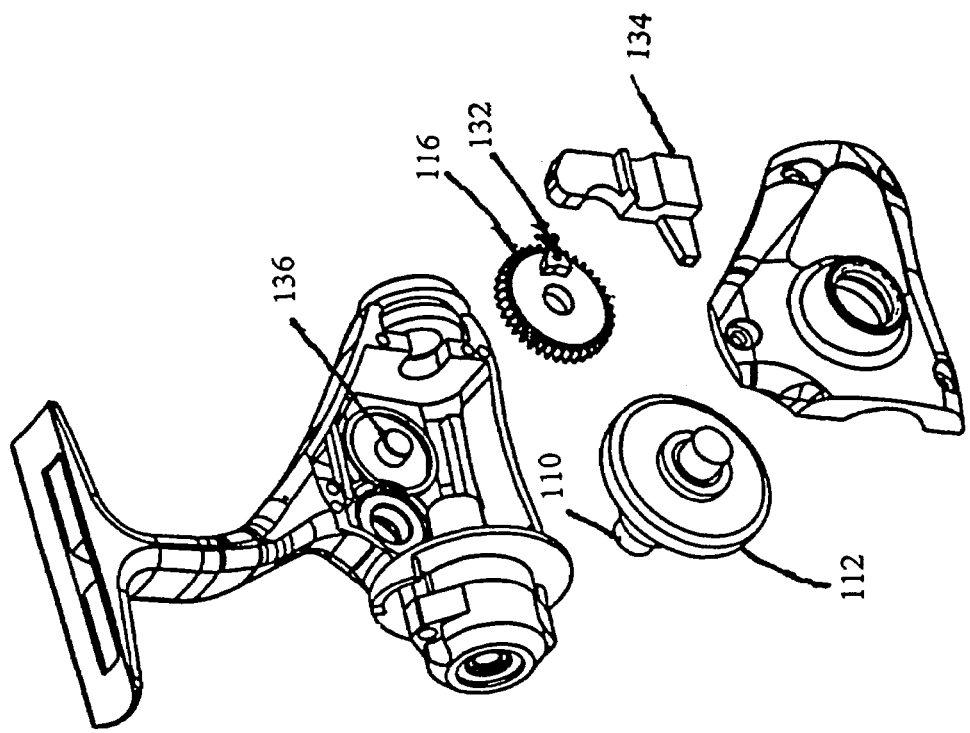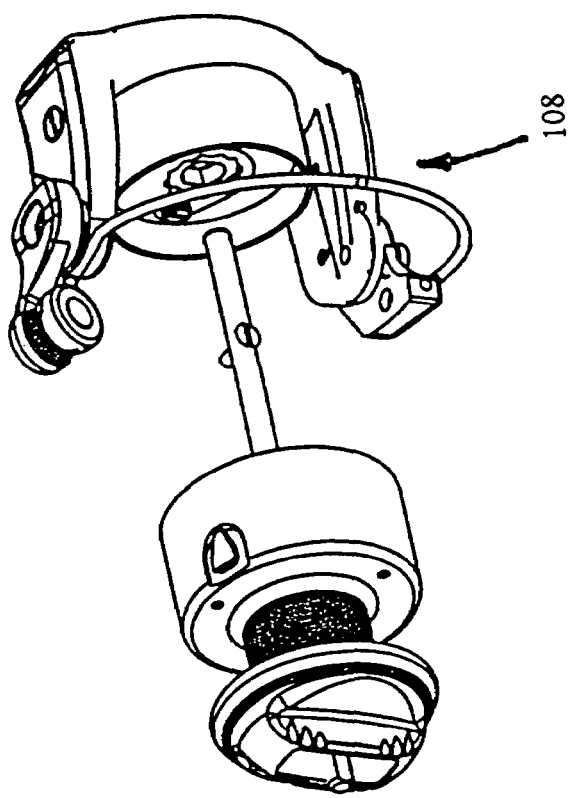
FIG. 4

FISHING REEL WITH UNIFORM OSCILLATION SYSTEM

This application is a continuation of my prior application Ser. No. 10/302,637, filed Nov. 21, 2002, now abandoned entitled "Uniform oscillation system", which was a continuation-in-part of my prior provisional patent application, Ser. No. 60/343,441, filed Dec. 31, 2001; and incorporates both of those applications herein as if fully set forth.

BACKGROUND OF THE INVENTION

1. Technical Field

This invention relates to fishing reels and particularly to a method and means of uniformly winding fishing line on to spinning reels.

2. Description of the Art

All spinning reels require some form of spool oscillation system that enables the spool to move back and forth as fishing line is being retrieved. Without this oscillation, the line would accumulate on the spool very unevenly. This is cosmetically and functionally undesirable.

Prior art FIG. 1, shows an exploded view of parts of a fishing reel as disclosed in FIG. 3 of U.S. Pat. No. 6,394,379, issued May 28, 2002, entitled "Spinning reel with uniform velocity spool". The fishing reel includes an oscillating assembly including a rotating oscillating member having a cam that slides along a working surface 86 in continuous engagement with the surface of a recessed area throughout rotation of an oscillating member 66 to produce an oscillation movement of a slider 68 coupled to the main shaft. See '379 patent, FIGS. 7 and 9 and column 7, lines 14 to 18 and column 8, lines 9–14.

In accordance with this patent, the figure-8 configuration of the recessed area in the slider 68 produces substantially uniform speed in the axial direction of main shaft 56 by rotation of oscillating member 66 at a constant speed. '379 patent, column 8, lines 46 et seq. Accordingly, this patent teaches a single cam roller surface on a figure-8 track.

Performance problems resulting from uneven line lay are: (1) casting distance is adversely affected and (2) drag release (while fighting a fish) will not be as smooth. A uniform oscillation system allows the line to be laid flat on the spool and, as a result, corrects these problems.

In addition to producing uniform line lay, a good oscillation system should be durable (for reliability), simple (for low cost) and compact (to keep the reel small). Generally, there are two types of systems in use. The first, a crosswind gear and block type, is durable, simple and compact. However, the line lay is only somewhat uniform, and not flat across the length of the spool. The second, the worm type, does give a flat line lay, but it is not durable and simple because there are more parts in the mechanism. Thus, currently, there is a need for a system which meets all of these criteria.

In the prior art, U.S. Pat. Nos. 6,170,773, 5,012,990 and 6,000,653 show elliptical grooves.

U.S. Pat. No. 5,921,489 discloses a stud with an elliptical-shaped cross-section. In one embodiment, there is a Z-shaped groove.

Italian reference number 694177, Sep. 3, 1965, discloses a Z-shaped groove which has straight sections as well as sharp breaks between sections.

A number of references show S-shaped grooves, such as U.S. Pat. Nos. 5,350,131 and 6,264,125. The latter has one straight leg in the groove as well as curved sections.

U.S. Pat. No. 3,367,597 shows a V-shape in the groove as well as an irregular shape in both the stud and the groove.

U.S. Pat. Nos. 2,990,130 and 3,055,607 disclose planetary gear systems with rounded gear teeth.

U.S. Pat. No. 3,119,573 discloses an eccentric system including an eccentric curved captive cam groove or path (see FIG. 2).

U.S. Pat. No. 5,513,814 shows a crank pin, eccentrically mounted on a satellite wheel.

U.S. Pat. Nos. 3,948,465, 4,196,869 and Japanese reference 154543 (1994) all show straight grooves with studs having circular cross-sections.

U.S. Pat. Nos. 5,678,780, 5,941,470, 5,934,586, 4,618, 107, 4,865,262 and 3,436,033 all show worm or helix gears with sliders, that is, eccentric crank pins engaging them.

It is my understanding that these all produce non-regular accumulations; particularly at the ends of the spool.

DISCLOSURE OF THE INVENTION

Summary of the Invention

My invention is a fishing reel with an improved uniform oscillation system that has all the benefits of being durable, simple and compact, while also producing a line lay that is comparable to more complicated systems. This is accomplished by making improvements to the crosswind gear and block type system. These modifications allow the block to travel at a more uniform speed throughout the entire oscillation cycle by, among other things, reducing dwell at the ends of the stroke.

The commonly existing system (such as that shown in U.S. Pat. No. 6,394,379) utilizes a gear 66 (with an off-center round pin 80), wherein the gear 66 rotates, and the pin 80 pushes the block 68 back and forth to provide the oscillation (see prior art FIG. 1). My invention has a reel which is essentially the same (see FIGS. 2 through 4) as the structure shown in this prior art patent, except that the pin 80 has been replaced by a cam stud means 132 having a lobe means 133 and the block 68 has been replaced with a block134. As can be seen from FIGS. 4 through 7, I have made the following modifications: first, instead of being a round pin, the lobe means 133 has a leading edge 40 to reduce dwell at the beginning of each stroke. Secondly, the lobe means 133 has a corner 48 to reduce dwell at the end of each stroke. A ramp is provided in the block 134 to increase the block speed at the end of each stroke. As a result, this new system provides a relatively uniform line lay which is desirable from both cosmetic and performance standpoints, while being very durable, simple and compact. This is explained in more detail in the accompanying Figures.

I have provided a new fishing reel driven by a handle comprising: a reel frame; a spool spindle reciprocated longitudinally in said reel frame between two positions at which the direction of motion of said spool spindle is reversed; a fixed spool, mounted at an end of said spool spindle and coaxially with said spool spindle; a rotary line recovery device mounted coaxially with said spool for guiding fishing line onto said spool; a crankshaft connected at one end of said handle for rotation therewith; a drive gear connected to said crankshaft for rotation therewith; a transmission system, for longitudinally reciprocating said spool spindle, including: a transverse block connected said spool spindle to translate therewith; said transverse block having a guide slot therein; a transverse crosswind post fixed to said frame; a crosswind gear rotating about said transverse crosswind post; said drive gear engaging said crosswind gear for rotating said crosswind gear upon rotation of said drive gear; a cam stud means eccentrically mounted on the crosswind gear to rotate in a circular path about the axis of rotation of said crosswind gear; said cam stud means positioned within said guide slot and engaging said block to displace said block and move the spool spindle in the direction parallel to the longitudinal axis; said block having walls forming said guide slot, comprising at least four surfaces; a first surface, a second surface at an angle to said first surface, a third surface, a fourth surface at an angle to said third surface; said first and third surfaces being substantially parallel to one another and said second and fourth surfaces being substantially parallel to one another; said cam stud means further comprising cam lobe means having at least three contiguous working surfaces; comprising a first radial surface; a second radial surface of a larger radius than said first radial surface; and a third radial surface following the second surface for engagement with the surfaces of said slot.

BRIEF DESCRIPTION OF DRAWINGS

FIG. 4 is an exploded perspective view of a reel in accordance with the preferred embodiment of my invention;

DESCRIPTION OF THE PREFERRED EMBODIMENTS

Figure 1:
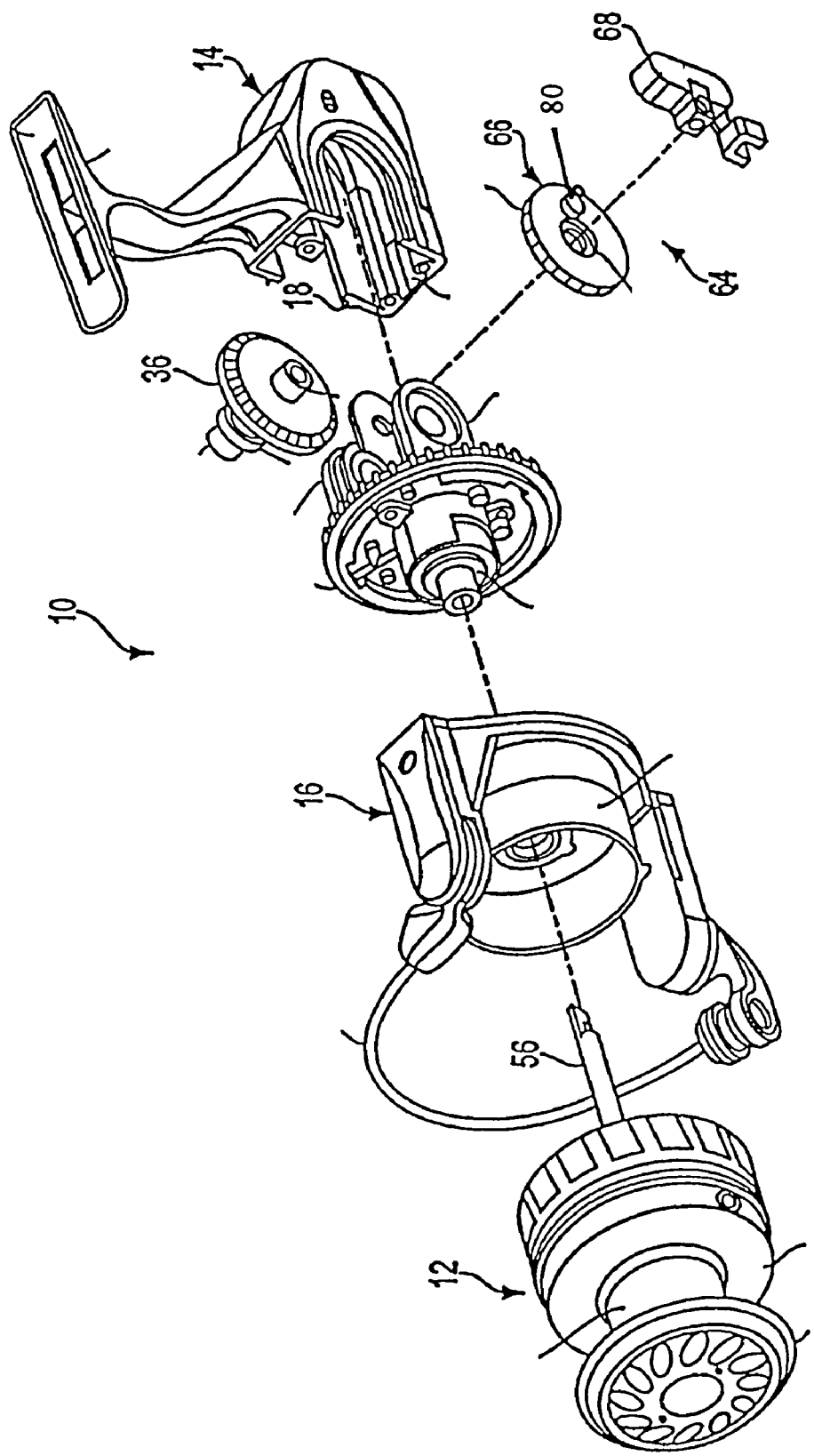
FIG. 1 is an exploded perspective view of a reel in accordance with the prior art.
Figure 8:
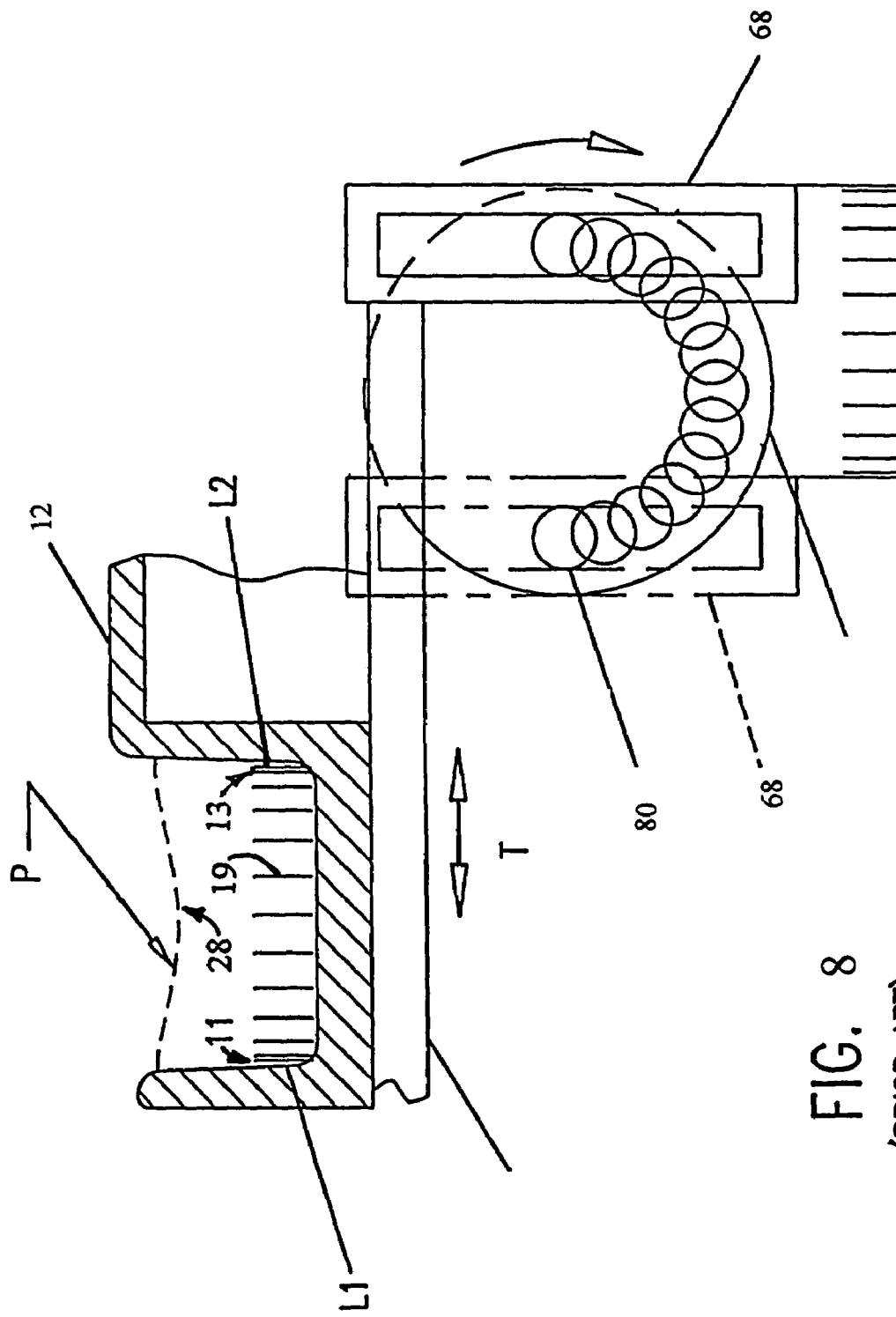
FIG. 8 is a schematic layout showing the operation of the common oscillating spinning reel winding system as known in the prior art.

The prior art, as shown in FIG. 1, comprises a reel 10 having a spool 12, an oscillating spool main shaft 56, an oscillating assembly 64, a rotor 16, a drive gear 36, a crosswind block 68 and a rotating crosswind gear 66. As line 19 (FIG. 8) is laid on the spool 12 in accordance with the prior art, more fishing line is laid at the ends, as shown diagrammatically at numbers 11 and 13 on the spool 12. Each of the lines shown in this envelope (from L1 through L2) within the spool 12 represents a portion of the lay of the fishing line per the location of the pin 18. The shape P of the lay of the spool line is shown at 28. The oscillating travel of the spool shaft 56 is shown by the double headed arrow T. The movement of the crosswind block 68 is from the position shown in full lines to the position shown in phantom lines and return.

Figure 2:
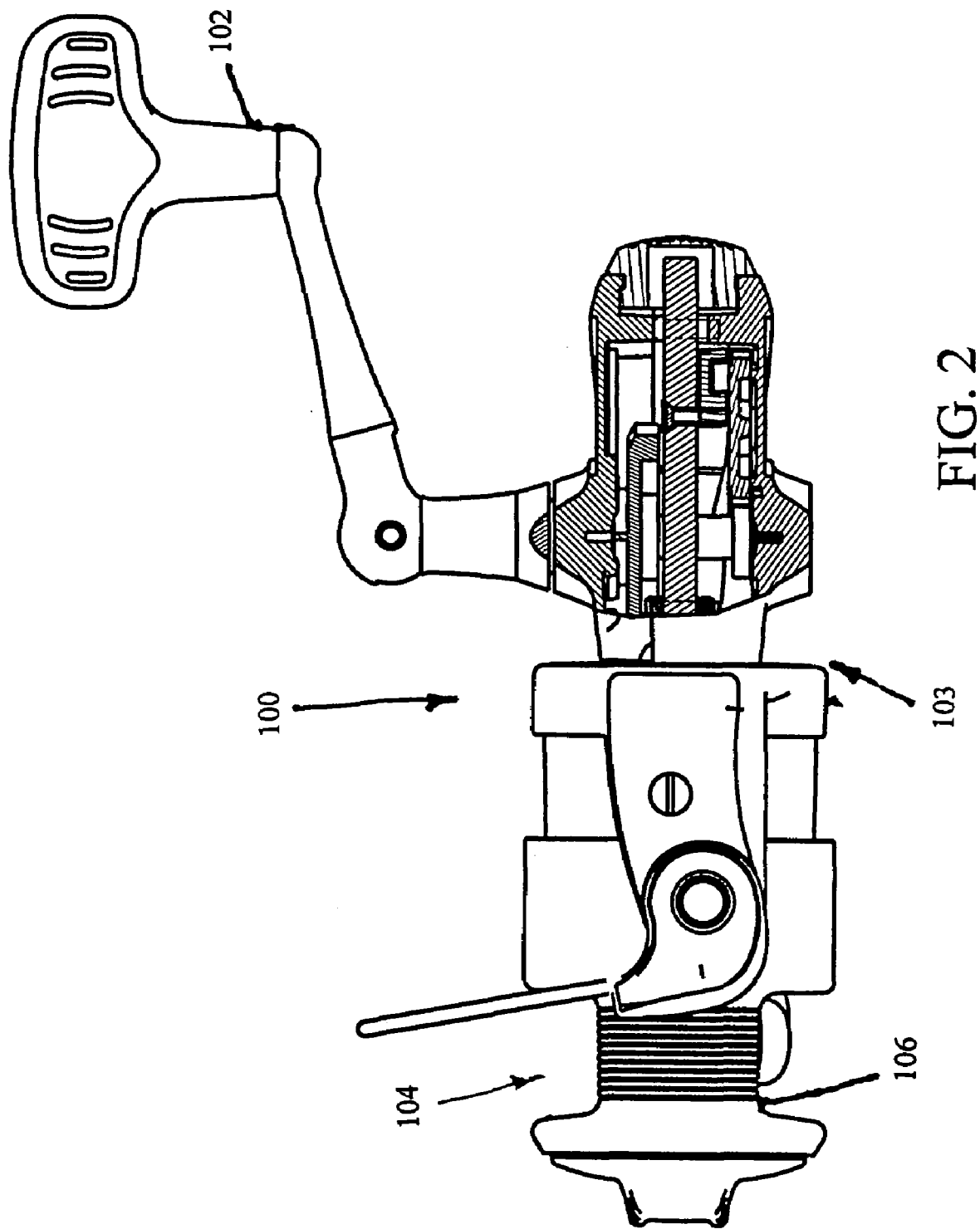
FIG. 2 is a vertical elevation, partially broken away, of a reel in accordance with my invention.
Figure 3:
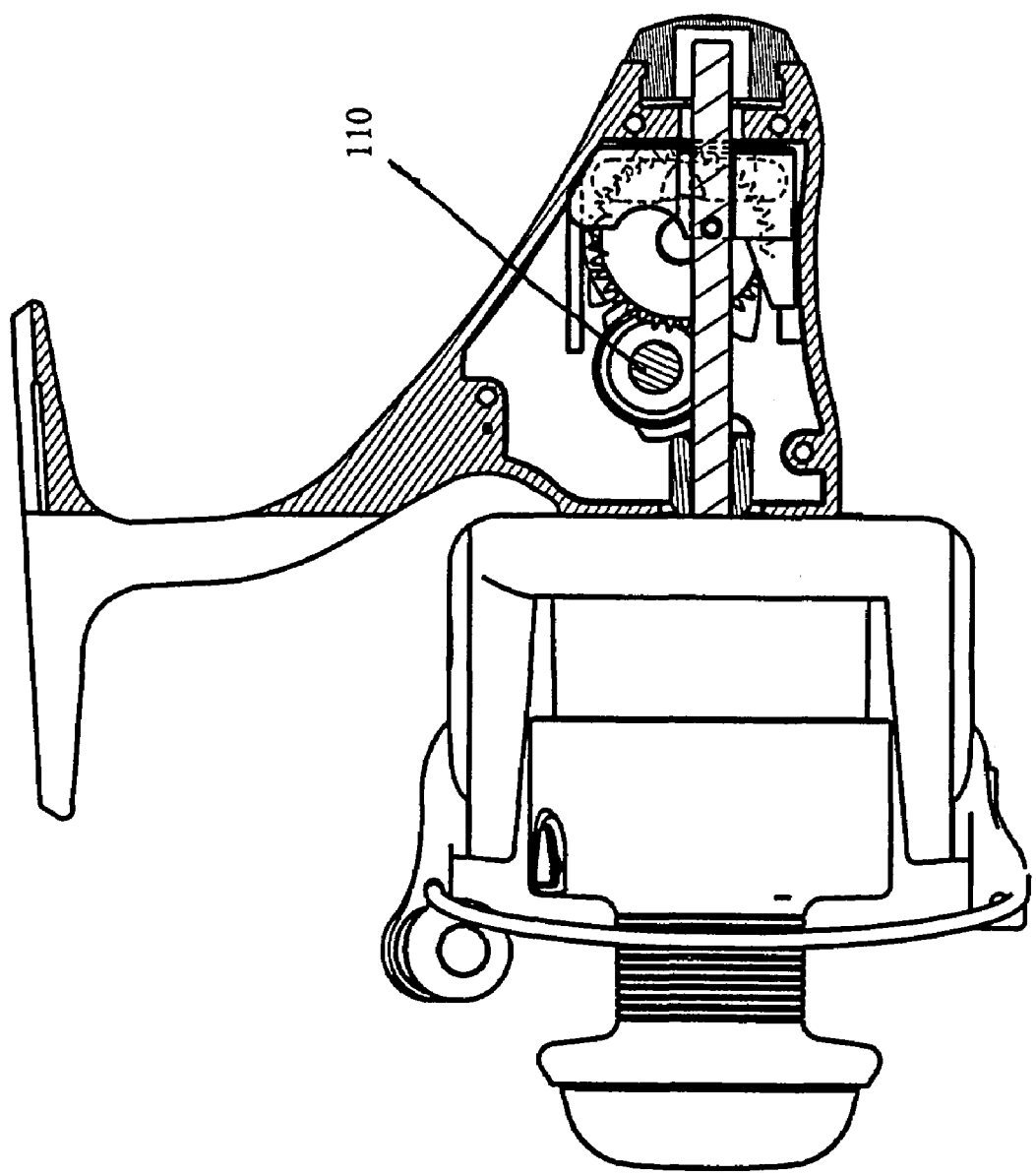
FIG. 3 is a vertical elevation rotated from the position shown in FIG. 2, partially broken away, of a reel in accordance with my invention.
Figure 5:
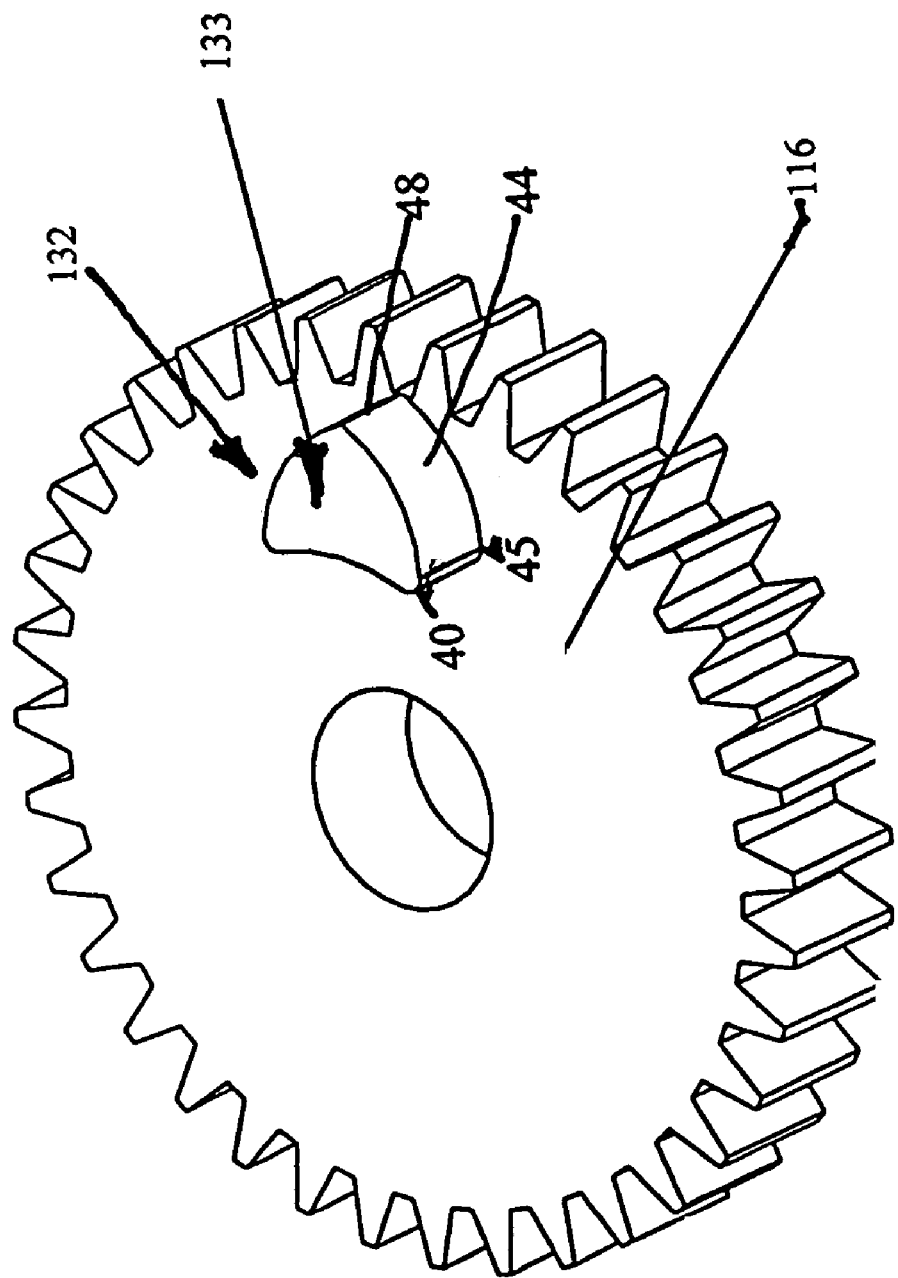
FIG. 5 is a perspective view of a portion of the reel shown in FIG. 4.
Figure 6:
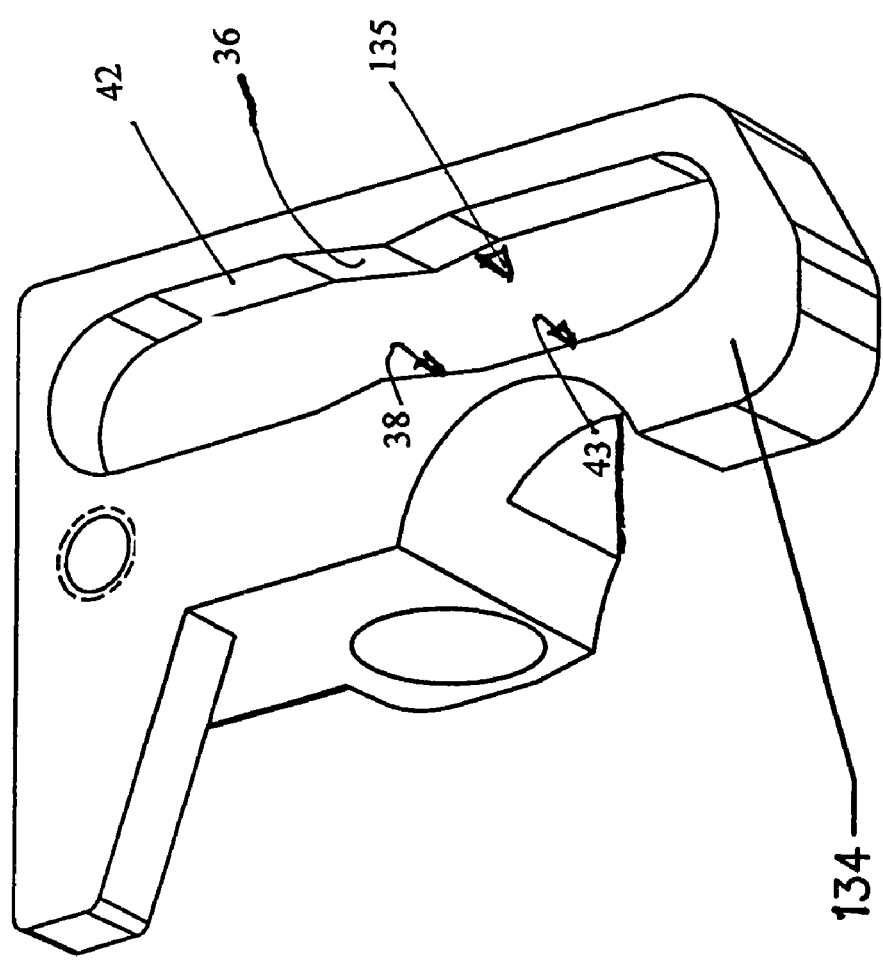
FIG. 6 is a perspective view of a portion of the reel shown in FIG. 4.
Figure 7:
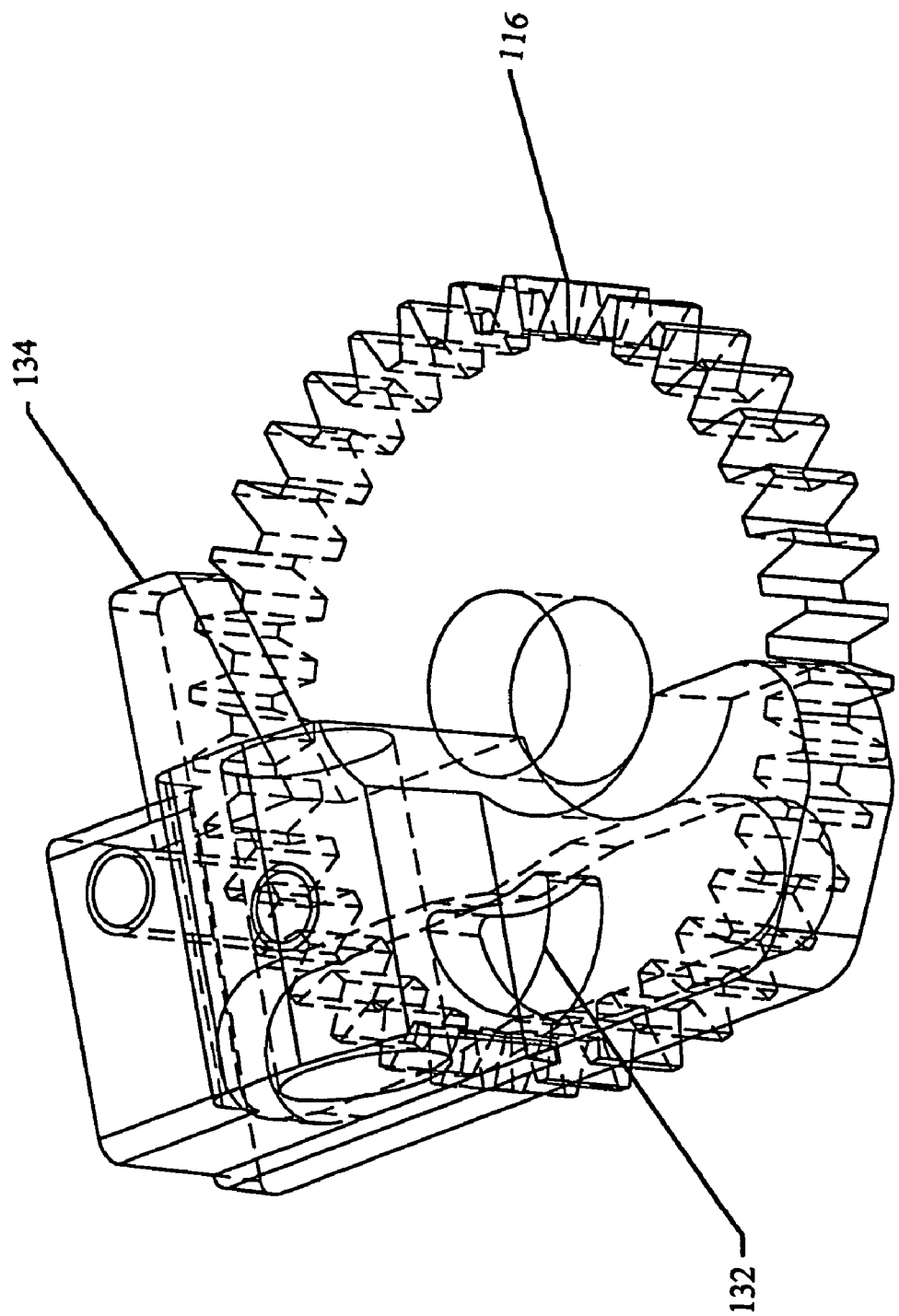
FIG. 7 is a perspective view of an assembled portion of the reel shown in FIGS. 4, 5 and 6.

In my system, the fishing reel 100 FIG. 2 comprises: a reel frame 103; a spool spindle means 104 mounted for reciprocation longitudinally in said reel frame between two positions at which the direction of motion of said spool spindle is reversed; a fixed spool 106, mounted at an end of said spool spindle means 104 and mounted coaxially with said spool spindle means 104; a rotary line recovery device 108 mounted coaxially with said spool for guiding fishing line onto said spool 106; a crankshaft 110 connected at one end to a handle 102 for rotation therewith; a drive gear 112 connected to said crankshaft 110 for rotation therewith; a transmission system, for longitudinally reciprocating said spool spindle means, comprising a transverse block 134 connected said spool spindle means to translate therewith; said transverse block having a guide slot 135 FIG. 6 therein; a transverse crosswind post 136 fixed to said frame; a crosswind gear 116 rotating about said transverse crosswind post 136; said drive gear 112 engaging said crosswind gear 116 for rotating said crosswind gear upon rotation of said drive gear; a cam stud means 132 eccentrically mounted on the crosswind gear 116 to rotate in a circular path about the axis of rotation of said crosswind gear; said cam stud means 132 positioned within said guide slot 135 and engaging said block 134 to displace said block and move the spool spindle means 104 in a direction parallel to its longitudinal axis; said block 134 having walls forming said guide slot, comprising at least four surfaces; a first surface 36, a second surface 42 at an angle to said first surface, a third surface 38, and a fourth surface 43 at an angle to said third surface; said first and third surfaces being substantially parallel to one another and said second and fourth surfaces being substantially parallel to one another (see FIG. 6); said cam stud means 132 further comprising a cam lobe means 133 having at least three contiguous working surfaces, comprising (see FIG. 5) a first radial surface 40; a second radial surface 44 of a larger radius than said first radial surface; and a third radial surface 48 following the second surface for engagement with the aforesaid surfaces of said slot.

Figure 9:
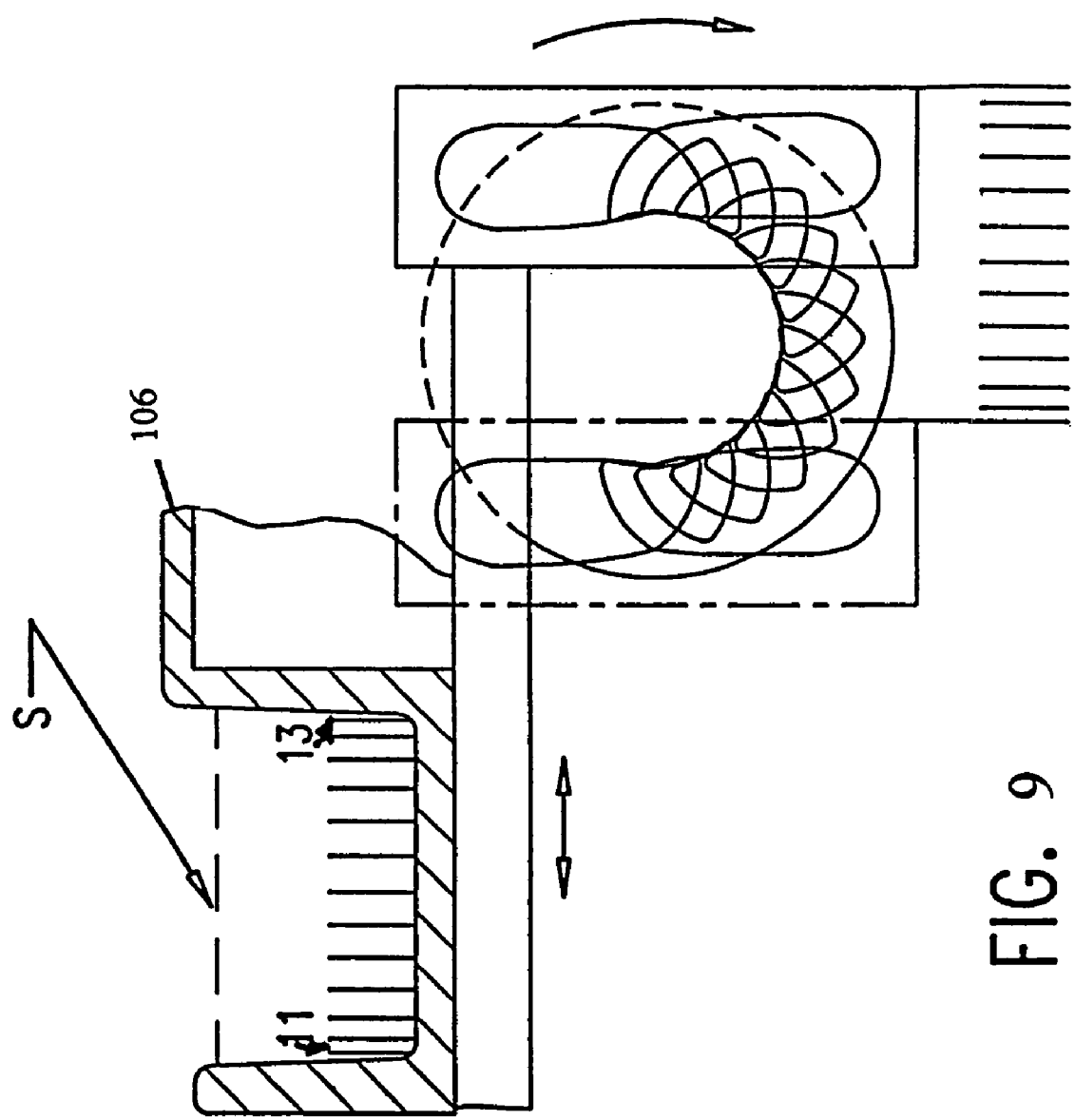
FIG. 9 is a schematic layout showing the operation of the uniform winding oscillating system in accordance with the preferred embodiment of my invention.

In accordance with my new uniform oscillation system, as shown in FIG. 9, the shape S of the profile of the lay of the line on the spool 106 is substantially uniform. Note that ideally the same amount of line is laid at the ends 11 and 13 of the spool as there is in the center. This is made possible by the improved mechanical pieces shown in FIGS. 4 through 6. A crosswind gear 116, FIGS. 4 and 5, supports a newly designed pin in the shape of a lobe means 133 which operates in cooperation with a newly designed crosswind block 134. The lines and arrows, FIG. 9, show moving stages. There are various advantages to the geometry of this newly designed lobe rotating during the gear rotation. In particular, the ramp 36 of the first surface speeds up block travel at the end of the stroke because the corner 48 of the lobe 32 rides up the ramp 36.

The corner speeds up block travel at the end of the stroke because the geometry of the lobe means 133 rotates as the gear 116 itself rotates; the leading edge speeds up block travel at the beginning of the stroke.

Although any one of these features will help with uniform oscillation; all three features produce the most uniform oscillation in accordance with the preferred embodiment of my invention. These features produce uniform oscillation in the horizontal direction by the gear rotating and the geometry of the lobe means 133 rotating during the gear rotation.

Figure 10:
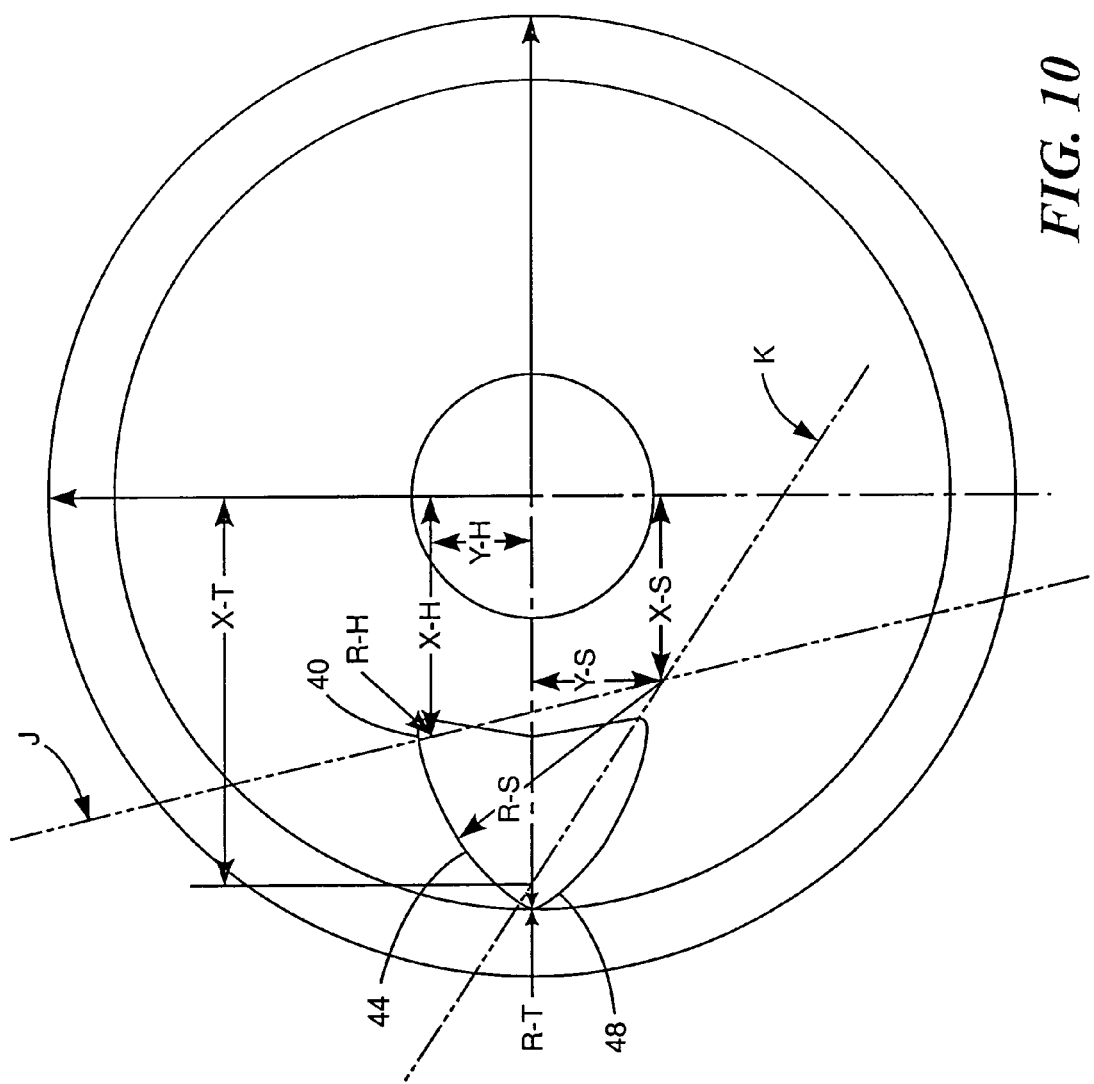
FIG. 10 is a plan view of a lobe in accordance with the preferred embodiment of my invention, showing diagrammatically its position on the crosswind gear.

The lobe and its position on the crosswind gear are shown in greater detail in FIG. 10; in which the values of the letters are as follows:

R-S=0.2285
X-S=0.1954
Y-S=0.1134
R-T=0.0189
X-T=0.3717
R-H=0.0135
X-H=0.2259
Y-H=0.0994

Figure 11:
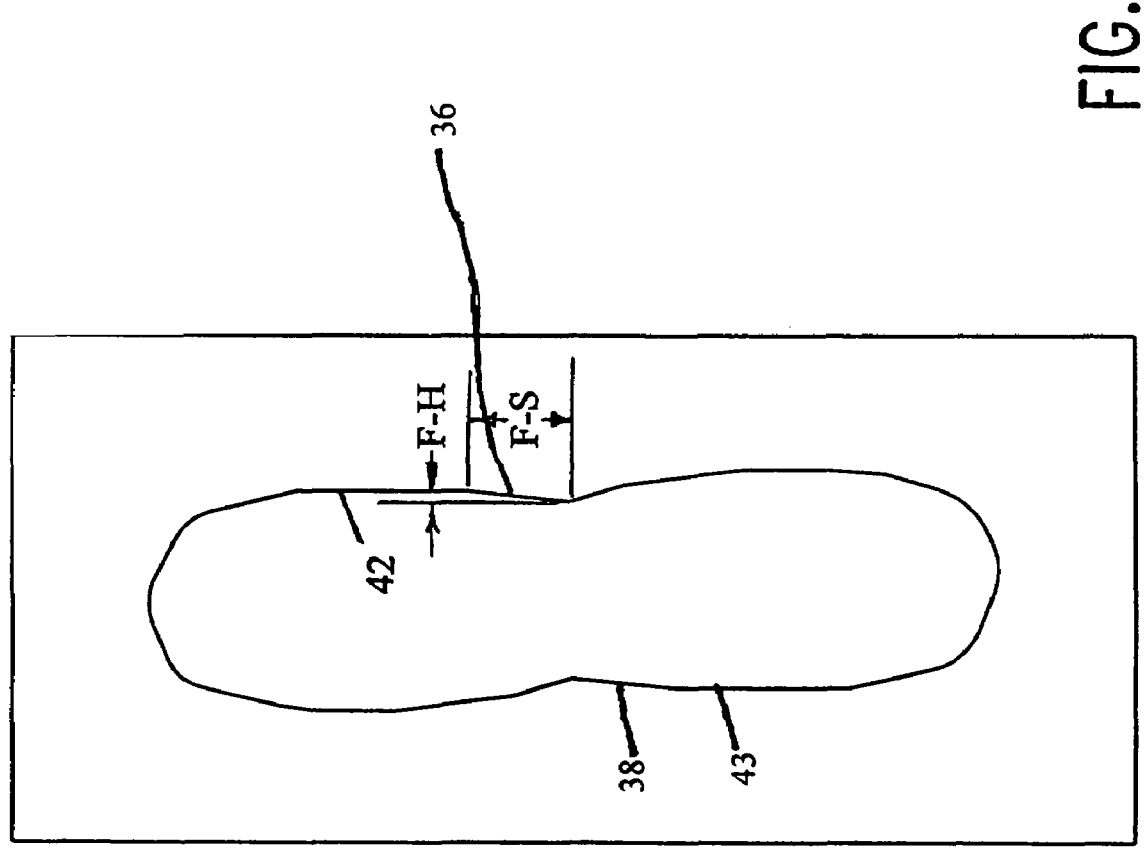
FIG. 11 is a plan view of a crosswind block.

The crosswind block 16 is shown in greater detail in FIG. 11; wherein F-S=0.1002 and F-H=0.0100.

Figure 13A:
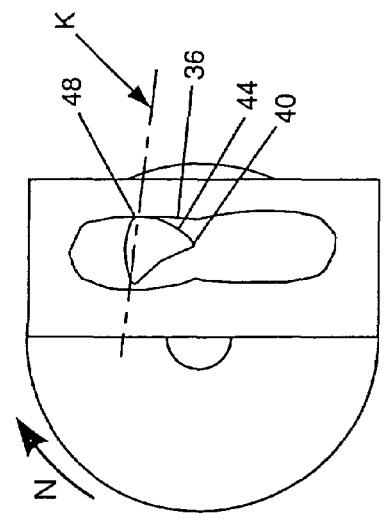
FIG. 13A is a schematic portion of a level wind apparatus in accordance with my invention showing the apparatus at a starting point.
Figure 13B:
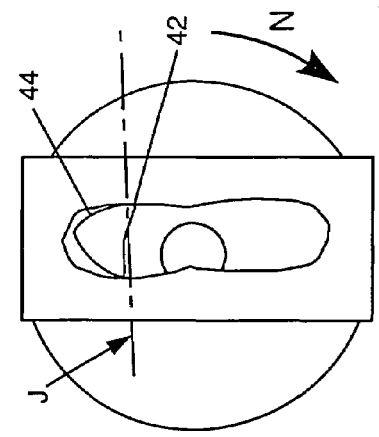
FIG. 13B is a schematic portion of a level wind apparatus in accordance with my invention showing the apparatus at the end of a first segment of travel after the starting point shown in FIG. 13A.
Figure 13C:
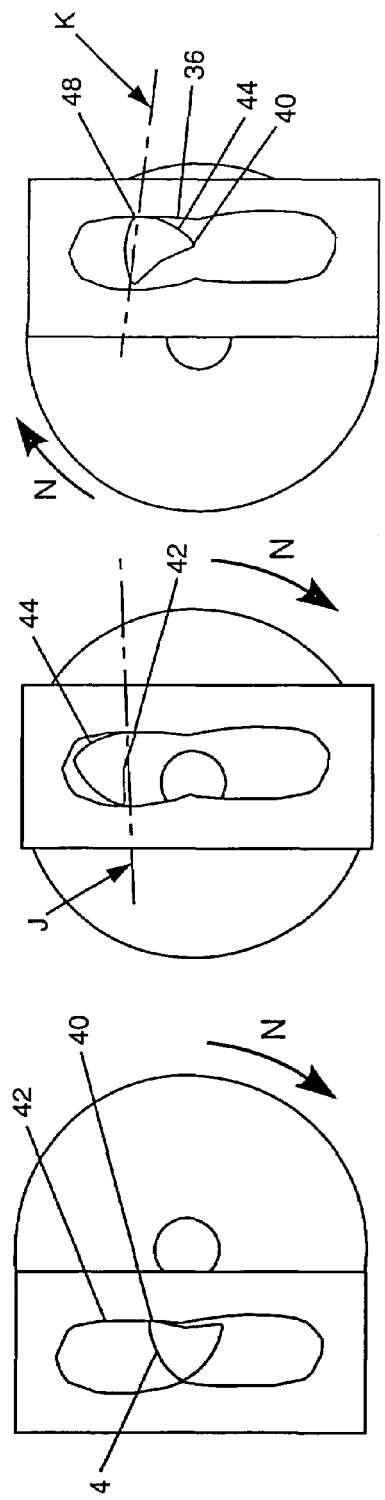
FIG. 13C is a schematic portion of a level wind apparatus in accordance with my invention showing the apparatus at the end of a second segment of travel after the starting point shown in FIG. 13A.
Figure 13D:
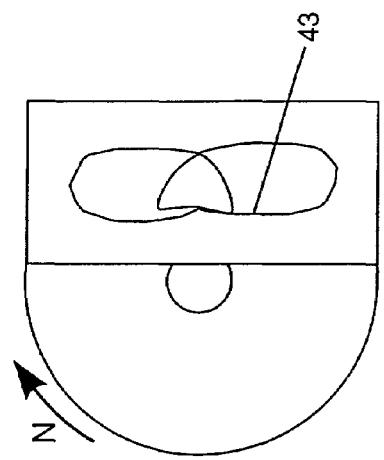
FIG. 13D is a schematic portion of a level wind apparatus in accordance with my invention showing the apparatus at the end of a third segment of travel after the starting point shown in FIG. 13A.
Figure 13E:
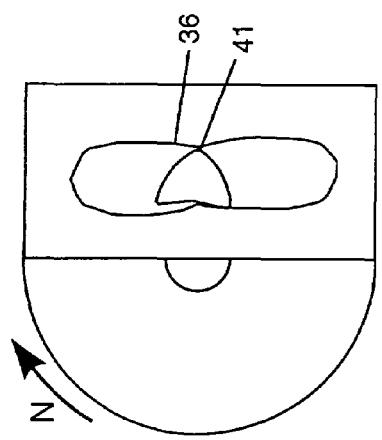
FIG. 13E is a schematic portion of a level wind apparatus in accordance with my invention showing the apparatus at the end of a forth segment of travel after the starting point shown in FIG. 13A.
Figure 13F:
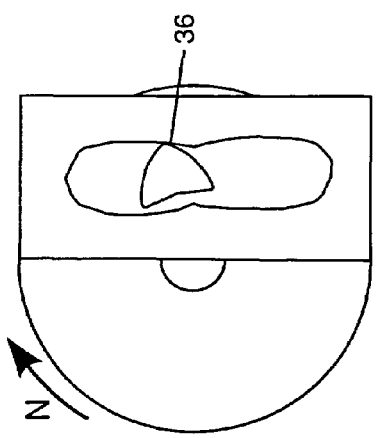
FIG. 13F is a schematic portion of a level wind apparatus in accordance with my invention showing the apparatus at the end of its cycle of travel after the starting point shown in FIG. 13A.

The interaction of these parts is shown in various time sequences in FIGS. 13A through 13F. The direction of rotation of the cross-wind gear is shown by the lines and arrows "N". FIG. 13A represents a schematic of a portion of the level wind apparatus at the starting point. FIG. 13B shows the device at the end of the first segment. FIG. 13C shows the device at the end of a second segment. FIG. 13D shows the device at the end of a third segment. FIG. 13E shows the apparatus at the end of a fourth segment. FIG. 13F shows the apparatus at the end of its cycle.

Figure 14:
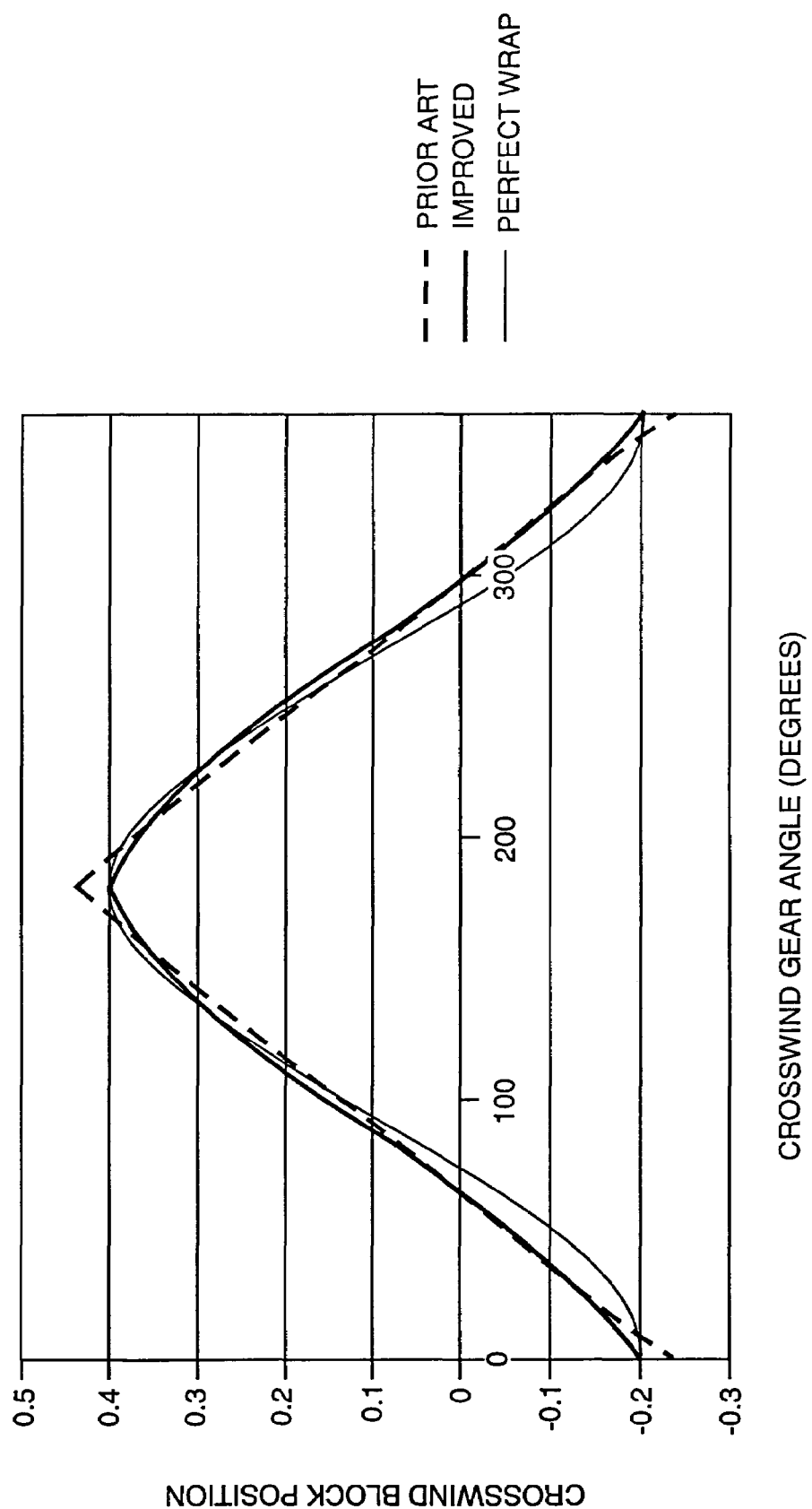
FIG. 14 is a plot showing the motion of a prior art mechanism and the plot of a theoretically perfect line wrap and the plot of my improved line wrap.

The following equations and explanations describe the motion of the spool oscillation mechanism with reference to these figures. Formulas are in terms of variables. FIGS. 13A–13F show the mechanism in positions that are transition points between different formulas that describe the motion of the mechanism. The equations that describe the motion were entered into a Microsoft Excel™ spreadsheet, and the results plotted for one rotation of the crosswind gear. For reference, a plot showing the motion of a prior art mechanism and a plot of a theoretically perfect line wrap has been plotted over the spreadsheet results as shown in FIG. 14.

The following is an analysis of my new spool oscillation system.

The axial position of the spool is determined by the position of the crosswind block relative to the crosswind gear. As the crosswind gear rotates, a cam lobe means 133 on its upper surface contacts the surfaces defining a uniquely shaped slot 135 in the underside of the crosswind block 134. 360 degrees of rotation of the gear will move the spool through a complete oscillation sequence, but symmetry of the crosswind block requires analysis of only the first 180 degrees of rotation. Displacements for the second 180 degrees of rotation are equal in magnitude, but opposite in direction to those of the first 180 degrees. R-T is the center of the third radial surface, R-S is the center of the second radial surface and R-H is the center of the first radial surface. It is theorized that five formulas may be used to describe the parameters of the oscillation system in accordance with my invention.

The five formulas describing the position of the block relative to the gear have been generated for the first 180 degrees of gear rotation. Each formula is valid only for a defined segment of the motion.

Figure 12:
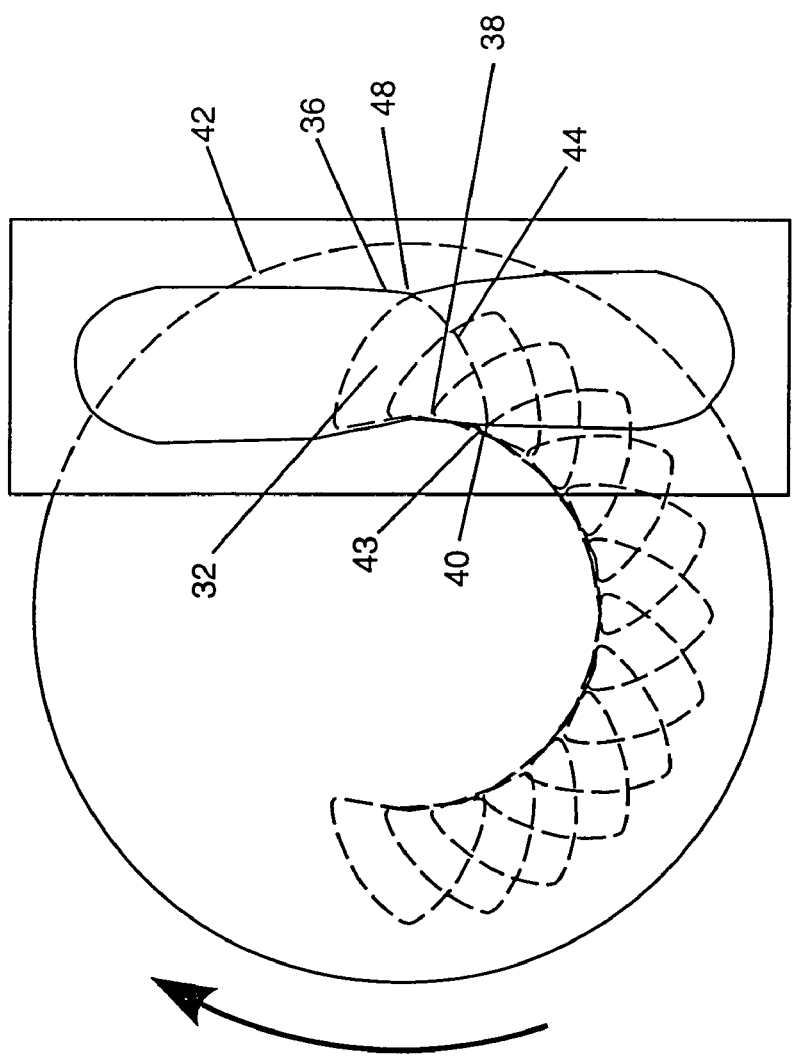
FIG. 12 is a schematic blow-up of a portion of the system shown in FIG. 9.

First Segment. The first segment of motion is for contact of a first radial surface 40 FIG. 5 with a second wall surface 42 FIGS. 6 and 12 forming the guide slot 135 in said block. This contact will take place from $\Phi=0°$ to a position where the centers of the first radial surface and a second radial surface are aligned (see line "J" FIGS. 10 and 13B) along a plane through line 45 FIG. 5 that is perpendicular to said second wall surface 42 of said block. Formulas defining this motion are: For $\Phi=0°$ to $\Phi=\Phi seq1$:

$$X=X_H \cos(-\Phi)-Y_H \sin(-\Phi)+R_H$$

$$\Phi_{seq1}=90+A\tan|(X_H-X_S)/(Y_H-Y_S)|$$

Second Segment. The second segment of motion is for contact of the second radial surface 44 FIGS. 5 and 12 of the cam lobe means 133 with said second wall surface 42 of the block. The range of this segment is from $\Phi=\Phi seq1$ to a position where a line drawn between centers of the radii of the second and third radial surfaces are aligned (see line "K" FIGS. 10 and 13C) along a line that is perpendicular to the second wall surface 42 of the block FIG. 13C. Formulas defining this motion are: For $\Phi=\Phi seq1$ to $\Phi=\Phi seq2$:

$$X=X_S \cos(-\Phi)-Y_S \sin(-\Phi)+R_S$$

$$\Phi seq2=90+A\tan|(X_T-X_S)/Y_S|$$

Third Segment. The third segment of motion is for contact of the third radial surface 48 of the cam lobe means 133 with the second wall surface 42 of the block. The range of this segment is from $\Phi=\Phi seq2$ to a point where the third radial surface 48 first contacts a first wall (ramp 36 FIGS. 6 and 12) surface of the slot of said block FIG. 13D.

For $\Phi=\Phi seq2$ to $\Phi=\Phi seq3$:

$$X=X_T \cos(-\Phi)+R_T$$

$$\Phi seq3=180-|(F_S+R_T \tan(A\tan(F_H/F_S)/2))/X_T|.$$

Fourth Segment. The fourth segment of motion is for contact of the third radial surface 48 of the cam lobe means with said first wall surface 36 of the block. The range of this segment is from $\Phi=\Phi seq3$ to a point where the third radial surface 48 of the cam lobe means 133 first contacts the end 41 of the first wall surface (ramp 36) of the block FIG. 13E.

For $\Phi = \Phi seq3$ to $\Phi = \Phi seq4$:

$$X = |\cos(180 - \Phi)X_T| + \cos(A\tan(F_H/F_s))R_T + \frac{F_H}{F_s}\left(F_s - |\sin(180 - \Phi)X_T| + R_T\sin\left(A\tan\left(\frac{F_H}{F_s}\right)\right)\right)$$

$$\Phi_{seq4} = 180 - A\sin\left[\frac{\sin\left(A\tan\left(\frac{F_H}{F_s}\right)\right)R_T}{|X_T|}\right]$$

Last Segment. The final segment of motion is for positions starting at the point where the third radial surface 48 just makes contact with the end 41 of the first wall surface 36 of the block 134 to the point at which the crosswind gear has rotated 180 degrees FIG. 13E.

For $\Phi = \Phi seq4$ to $\Phi = 180°$:

$$X = \cos(180 - \Phi)|X_T| + \cos\left[A\sin\left(\frac{\sin(180 - \Phi)|X_T|}{R_T}\right)\right]R_T + F_H$$

From this analysis, it will be noted that my invention provides a new fishing reel driven by a handle comprising: a reel frame; a spool spindle means mounted to be reciprocated longitudinally in said reel frame between two positions at which the direction of motion of said spool spindle is reversed; a fixed spool mounted at an end of said spool spindle and coaxially with said spool spindle means; a rotary line recovery device mounted coaxially with said spool for guiding fishing line onto said spool; a crankshaft connected at one end of said handle for rotation therewith; a drive gear connected to said crankshaft for rotation therewith; a transmission system, for longitudinally reciprocating said spool spindle means, comprising: a transverse block connected said spool spindle to translate therewith; said transverse block having a guide slot therein; a transverse crosswind post fixed to said frame; a crosswind gear rotating about said transverse crosswind post; said drive gear engaging said crosswind gear for rotating said crosswind gear upon rotation of said drive gear; a cam stud means eccentrically mounted on the crosswind gear to rotate in a circular path about the axis of rotation of said crosswind gear; said cam stud means positioned within said guide slot and engaging said block to displace said block and move the spool spindle means in the direction parallel to its longitudinal axis; said block having walls forming said guide slot, comprising at least four surfaces; a first surface, a second surface at an angle to said first surface, a third surface, a fourth surface at an angle to said third surface; said first and third surfaces being substantially parallel to one another and said second and fourth surfaces being substantially parallel to one another; said cam stud means further comprising cam lobe means having at least three contiguous working surfaces; comprising a first radial surface; a second radial surface of a larger radius than said first radial surface; and a third radial surface following the second surface for engagement with the surfaces of said slot.

In FIGS. 15 through 18, I have shown alternate and less desirable forms of my invention. These forms incorporate one or more of the features of my invention, but do not incorporate others. Accordingly, they provide a less uniform wind.

Figure 15:
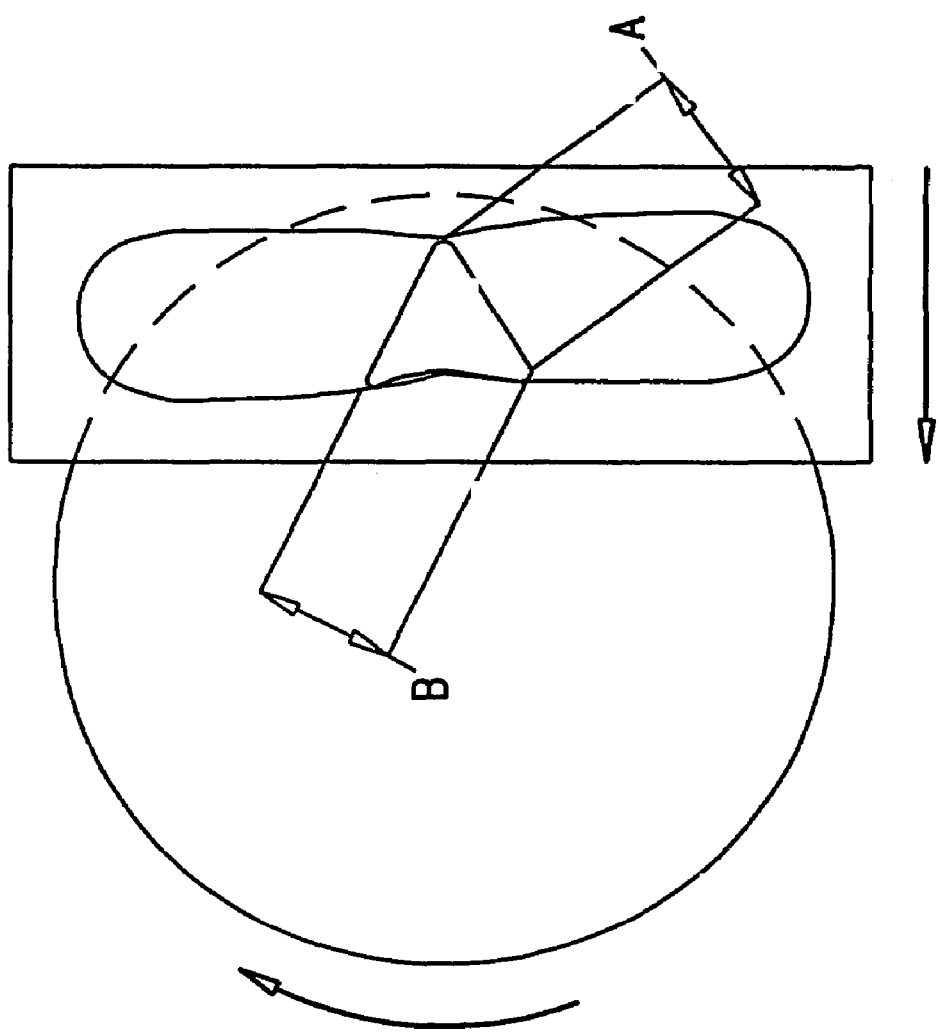
FIG. 15 is a schematic plan view of an alternate embodiment of my oscillating system.

In the alternate embodiment shown in FIG. 15, the device will produce a somewhat uniform oscillation, but because of the large difference between the distances "A" and "B" (as illustrated), excessive clearance between the lobe and crosswind block slot will occur at various degrees of the gear rotation. With one side of the lobe flat, the second radial surface is no longer there to make up the space. This causes a jerky movement and a slightly less uniform distribution of line.

Figure 16:
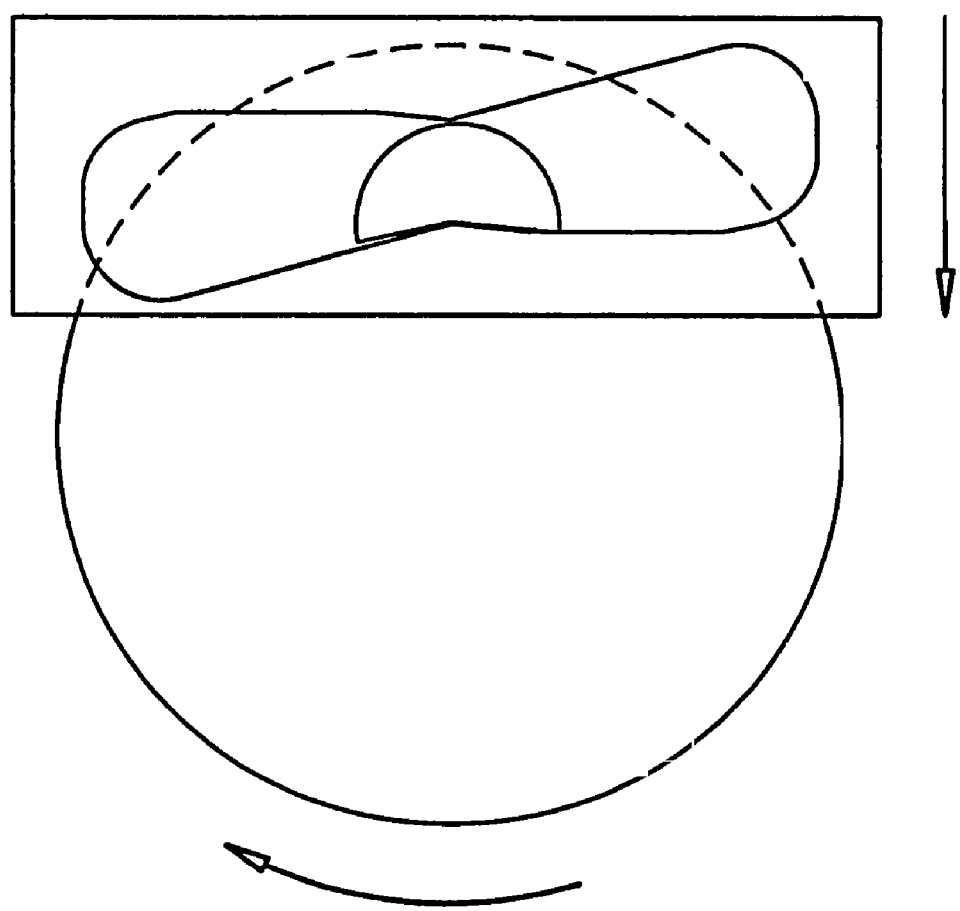
FIG. 16 is a schematic plan view of a different alternate embodiment of my new oscillating system.

In the second alternate embodiment shown in FIG. 16, the lobe is reconfigured so it does not have a corner to speed up the block travel at the end of the stroke. Therefore, at least 90 degrees of rotation would have no more effect than just a round pin. Thus, this will produce not as uniform a distribution of line as would be the case if my preferred embodiment was used.

Figure 17:
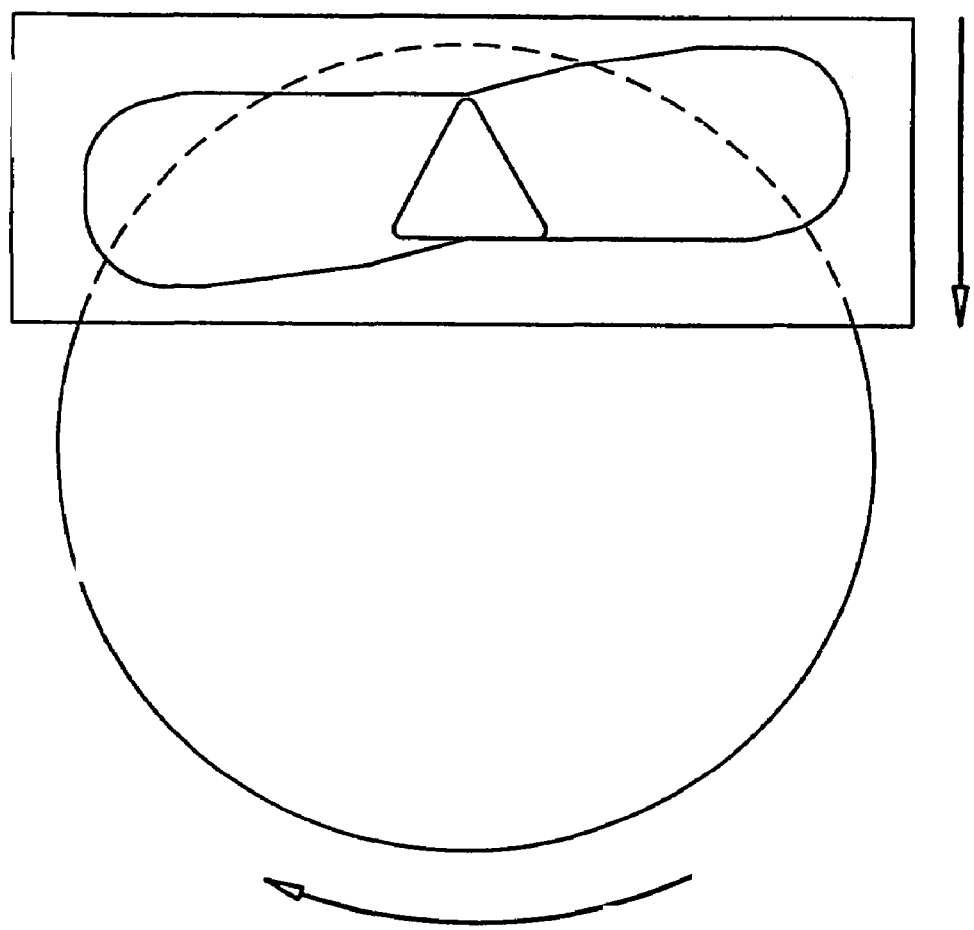
FIG. 17 is a schematic plan view of a further alternate embodiment of my oscillating system.

In the third alternate embodiment shown in FIG. 17, a crosswind block has been modified so that it does not have a ramp therein to speed up the block travel at the end of the stroke. In my preferred embodiment, I get a little extra travel because of the ramp action. Here, there is no ramp and thus that extra travel is missing. Therefore, one would not get as flat a line wrap.

Figure 18:
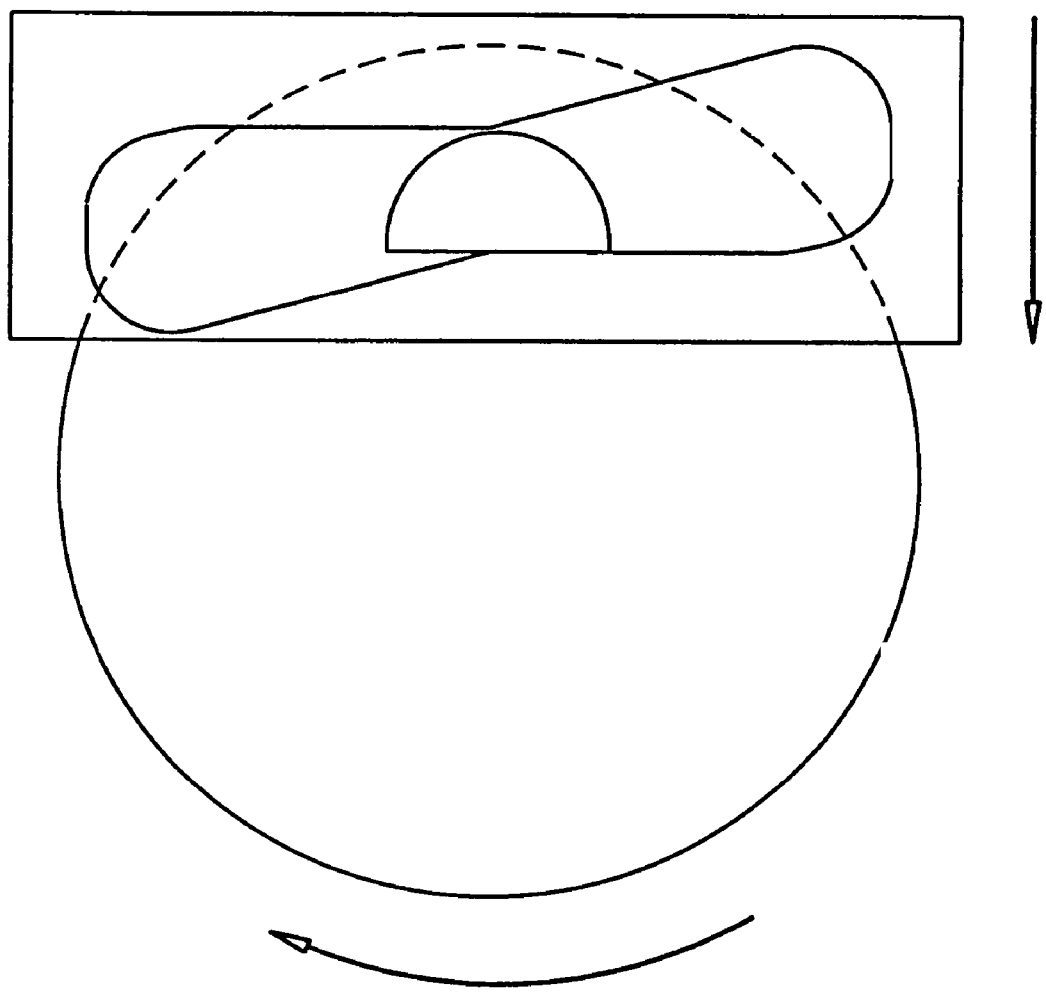
FIG. 18 is a schematic plan view of a further alternate embodiment of my oscillating system.

In the fourth alternate embodiment shown in FIG. 18, the crosswind block has been modified so that it does not have a ramp therein. The lobe has been modified so it does not have a corner on the lobe to speed up travel at the end of the stroke.

What is claimed is:

1. In a fishing reel having a crosswind drive gear connected to a crankshaft for rotation therewith; and a transmission system having a transverse cross wind block connected a spool spindle means to translate therewith for longitudinally reciprocating said spool spindle means upon rotation of said crankshaft; said transverse crosswind block having a guide slot therein; and a cam stud means eccentrically mounted on the crosswind drive gear to rotate in a circular path about the axis of rotation of said crosswind drive gear; the cam stud means positioned within said guide slot and engaging said crosswind block to displace said block and move the spool spindle means in the direction parallel to its longitudinal axis;

said crosswind block having walls forming said guide slot, comprising at least four surfaces; a first surface, a second surface at an angle to said first surface, a third surface, a fourth surface at an angle to said third surface; said first and third surfaces being substantially parallel to one another and said second and fourth surfaces being substantially parallel to one another; and said cam stud means further comprising cam lobe means having at least three contiguous working surfaces; comprising a first radial surface; a second radial surface of a larger radius than said first radial surface; and a third radial surface following the second surface for engagement with the surfaces of said guide slot.

2. The reel of claim 1 wherein the third radial surface of the lobe means has a larger radius than that of the first radial surface of the lobe means.

3. The reel of claim 1 wherein said angle between said first and second surfaces of said guide slot is obtuse.

4. The reel of claim 1 wherein said angle between said third and fourth surfaces of said guide slot is obtuse.

5. The reel of claim 1 wherein the engagement between the cam lobe means and the wall surfaces of the block occurs along five segments of motion over 180 degrees of travel of said cam lobe means about the axis of rotation of the crosswind gear post.

6. The reel of claim 5 wherein the first radial surface of said cam lobe means engages said second wall surface of said guide slot at the beginning of a first segment of motion from a starting position to a position wherein the radial centers of the first and second radial surfaces are aligned along a line which is perpendicular to said second wall surface.

7. The reel of claim 5 wherein the first radial surface of said cam lobe means engages said second wall surface of said guide slot from a starting position at the beginning of a first segment of motion to a position wherein the second radial surface first engages the second wall surface.

8. The reel of claim 5 wherein the second radial surface of said cam lobe means engages said second wall surface of said guide slot at the beginning of a second segment of motion from a starting position wherein the radial centers of the first and second radial surfaces are aligned along a line which is perpendicular to said second wall surface, to a position wherein the radial centers of the second and third radial surfaces are aligned along a line which is perpendicular to said second wall surface.

9. The reel of claim 5 wherein the second radial surface of said cam lobe means engages said second wall surface of said guide slot at the beginning of a second segment of motion from a starting position wherein the second radial surface first engages the second wall surface to a position wherein the third radial surface contacts the second wall surface.

10. The reel of claim 5 wherein the third radial surface engages the second wall surface of said guide slot for a third segment of motion from the point where the third radius first contacts the second wall surface of the guide slot to a point where the third radial surface first contacts the first wall surface of the guide slot.

11. The reel of claim 5 wherein the third radial surface contacts the first wall surface of said guide slot for a fourth segment of motion from the point where it first engages said first wall surface to a point where it first engages the end of said first wall surface.

12. The reel of claim 5 wherein the third radial surface contacts the first wall surface of said guide slot for a fifth segment of motion from the point where it first engages the end of said wall surface to a point where it disengages from the end of said wall surface.

13. The reel of claim 6 wherein this engagement will take place from $\Phi=0°$ to a position where the centers of the first radial surface and a second radial surface are aligned along a line that is perpendicular to said second wall surface of said block; the formulas defining this motion are:

For $\Phi=0°$ to $\Phi=\Phi seq1$ $X = X_H \cos(-\Phi) - Y_H \sin(-\Phi) + R_H$ $\Phi_{seq1} = 90 + A\tan|(X_H - X_S)/(Y_H - Y_S)|$ 14. The reel of claim 8 wherein this engagement is from $\Phi=\Phi seq1$ to a position where a line drawn between centers of the radii of the second and third radial surfaces are aligned along a line that is perpendicular to the second wall surface of the block; the formulas defining this motion are:

For $\Phi=\Phi seq1$ to $\Phi=\Phi seq2$ $X = X_S \cos(-\Phi) - Y_S \sin(-\Phi) + R_S$ $\Phi_{seq2} = 90 + A\tan|(X_T - X_S)/Y_S|$ 15. The reel of claim 10 wherein this engagement is from $\Phi=\Phi seq2$ to a point where the third radial surface first contacts the first wall surface of the slot of said block; The formulas defining this motion are:

For $\Phi=\Phi seq2$ to $\Phi=\Phi seq3$ $X = X_T \cos(-\Phi) + R_T$ $\Phi_{seq3} = 180 - |(F_S + R_T \tan(A \tan(F_H/F_S)/2))/X_T|$ 16. The reel of claim 11 wherein this engagement is from $\Phi=\Phi seq3$ to a point where the third radial surface of the cam lobe means contacts the end of the first wall surface of the block; the formulas defining this motion are:

For $\Phi=\Phi seq3$ to $\Phi=\Phi seq4$ $X = |\cos(180 - \Phi)X_T| + \cos(A\tan(F_H/F_S))R_T +$
$\frac{F_H}{F_S}\left(F_S - |\sin(180 - \Phi)X_T| + R_T \sin\left(A\tan\left(\frac{F_H}{F_S}\right)\right)\right)$ $\Phi_{seq4} = 180 - A\sin\left\{\frac{\sin\left(A\tan\left(\frac{F_H}{F_S}\right)\right)R_T}{|X_T|}\right\}$ 17. The reel of claim 12 wherein this engagement is from the point where the third radial surface just makes contact with the end of the first wall surface of the block to the point at which the crosswind gear has rotated 180 degrees; the formulas defining this motion are:

For $\Phi=\Phi seq4$ to $\Phi=180°$ $X = \cos(180 - \Phi)|X_T| + \cos\left[A\sin\left(\frac{\sin(180 - \Phi)|X_T|}{R_T}\right)\right]R_T + F_H$ 18. A method of winding a line on a fishing reel driven by a handle connected to a crankshaft and having a crosswind drive gear connected to said crankshaft for rotation therewith; and a transmission system having a transverse cross wind block connected a spool spindle means to translate therewith for longitudinally reciprocating said spool spindle means upon rotation of said crankshaft; said transverse crosswind block having a guide slot therein; and a cam stud means eccentrically mounted on the crosswind drive gear to rotate in a circular path about the axis of rotation of said crosswind drive gear; said cam stud means positioned within said guide slot and engaging said crosswind block to displace said block and move the spool spindle means in the direction parallel to its longitudinal axis; comprising providing
    said crosswind block with walls forming said guide slot, comprising at least four surfaces;
    a first surface, a second surface at an angle to said first surface, a third surface, a fourth surface at an angle to said third surface; said first and third surfaces being substantially parallel to one another and said second and fourth surfaces being substantially parallel to one another; and providing a said cam stud means with a cam lobe means having at least three contiguous working surfaces; comprising a first radial surface; a second radial surface of a larger radius than said first radial surface; and a third radial surface following the second surface for engagement with the surfaces of said guide slot.

19. The method of claim 18 wherein the third radial surface of the lobe means has a larger radius than that of the first radial surface of the lobe means.

20. The method of claim 18 wherein said angle between said first and second surfaces of said guide slot is obtuse.

21. The method of claim 18 wherein said angle between said third and fourth surfaces of said guide slot is obtuse.

22. The method of claim 18 wherein the engagement between the cam lobe means and the wall surfaces of the block occurs along five segments of motion over 180 degrees of travel of said cam lobe means about the axis of rotation of the crosswind gear post.

23. The method of claim 22 wherein the first radial surface of said cam lobe means engages said second wall surface of said guide slot at the beginning of a first segment of motion from a starting position to a position wherein the radial centers of the first and second radial surfaces are aligned along a line which is perpendicular to said second wall surface.

24. The method of claim 22 wherein the first radial surface of said cam lobe means engages said second wall surface of said guide slot from a starting position at the beginning of a first segment of motion to a position wherein the second radial surface first engages the second wall surface.

25. The method of claim 22 wherein the second radial surface of said cam lobe means engages said second wall surface of said guide slot at the beginning of a second segment of motion from a starting position wherein the radial centers of the first and second radial surfaces are aligned along a line which is perpendicular to said second wall surface, to a position wherein the radial centers of the second and third radial surfaces are aligned along a line which is perpendicular to said second wall surface.

26. The method of claim 22 wherein the second radial surface of said cam lobe means engages said second wall surface of said guide slot at the beginning of a second segment of motion from a starting position wherein the second radial surface first engages the second wall surface to a position wherein the third radial surface contacts the second wall surface.

27. The method of claim 22 wherein the third radial surface engages the second wall surface of said guide slot for a third segment of motion from the point where the third radius first contacts the second wall surface of the guide slot to a point where the third radial surface first contacts the first wall surface of the guide slot.

28. The method of claim 22 wherein the third radial surface contacts the first wall surface of said guide slot for a fourth segment of motion from the point where it first engages said first wall surface to a point where it first engages the end of said first wall surface.

29. The method of claim 22 wherein the third radial surface contacts the first wall surface of said guide slot for a fifth segment of motion from the point where it first engages the end of said wall surface to a point where it disengages from the end of said wall surface.

30. The method of claim 23 wherein this engagement will take place from $\Phi=0°$ to a position where the centers of the first radial surface and a second radial surface are aligned along a line that is perpendicular to said second wall surface of said block; the formulas defining this motion are:

For $\Phi=0°$ to $\Phi=\Phi seq1$ $X=X_H \cos(-\Phi)-Y_H \sin(-\Phi)+R_H$ $\Phi_{seq1}=90+A \tan|(X_H-X_S)/(Y_H-Y_S)|$.

31. The method of claim 25 wherein this engagement is from $\Phi=\Phi seq1$ to a position where a line drawn between centers of the radii of the second and third radial surfaces are aligned along a line that is perpendicular to the second wall surface of the block; the formulas defining this motion are:

For $\Phi=\Phi seq1$ to $\Phi=\Phi seq2$ $X=X_S \cos(-\Phi)-Y_S \sin(-\Phi)+R_S$ $\Phi seq2=90+A \tan|(X_T-X_S)/Y_S|$.

32. The method of claim 27 wherein this engagement is from $\Phi=\Phi seq2$ to a point where the third radial surface first contacts the first wall surface of the slot of said block; the formulas defining this motion are:

For $\Phi=\Phi seq2$ to $\Phi=\Phi seq3$ $X=X_T \cos(-\Phi)+R_T$ $\Phi seq3=180-|(F_S+R_T \tan(A \tan(F_H/F_S)/2))/X_T|$.

33. The method of claim 28 wherein this engagement is from $\Phi=\Phi seq3$ to a point where the third radial surface of the cam lobe means contacts the beginning of the first wall surface of the block; the formulas defining this motion are:

For $\Phi=\Phi seq3$ to $\Phi=\Phi seq4$ $$X = |\cos(180-\Phi)X_T| + \cos(A\tan(F_H/F_s))R_T + \frac{F_H}{F_s}\left(F_s - |\sin(180-\Phi)X_T| + R_T\sin\left(A\tan\left(\frac{F_H}{F_s}\right)\right)\right)$$

$$\Phi_{seq4} = 180 - A\sin\left[\frac{\sin\left(A\tan\left(\frac{F_H}{F_s}\right)\right)R_T}{|X_T|}\right].$$

34. The method of claim 29 wherein this engagement is from the point where the third radial surface just makes contact with the beginning of the first wall surface of the block to the point at which the crosswind gear has rotated 180 degrees; the formulas defining this motion are:

For $\Phi=\Phi seq4$ to $\Phi=180°$ $$X = \cos(180-\Phi)|X_T| + \cos\left[A\sin\left(\frac{\sin(180-\Phi)|X_T|}{R_T}\right)\right]R_T + F_H.$$

35. A fishing reel driven by a handle comprising:
a reel frame;
a spool spindle means mounted to be reciprocated longitudinally in said reel frame between two positions at which the direction of motion of said spool spindle means is reversed;
a fixed spool, mounted at an end of said spool spindle means and coaxially with said spool spindle means;
a rotary line recovery device mounted coaxially with said spool for guiding fishing line onto said spool;
a crankshaft connected at one end of said handle for rotation therewith;
a drive gear connected to said crankshaft for rotation therewith;
a transmission system, for longitudinally reciprocating said spool spindle means, comprising:
a transverse block connected said spool spindle means to translate therewith; said
transverse block having a guide slot therein;
a transverse crosswind post fixed to said frame;

a crosswind gear rotating about said transverse crosswind post;

said drive gear engaging said crosswind gear for rotating said crosswind gear upon rotation of said drive gear;

a cam stud means eccentrically mounted on the crosswind gear to rotate in a circular path about the axis of rotation of said crosswind gear;

said cam stud means positioned within said guide slot and engaging said block to displace said block and move the spool spindle means in the direction parallel to its longitudinal axis;

said block having walls forming said guide slot, comprising at least four surfaces; a first surface, a second surface at an angle to said first surface, a third surface, a fourth surface at an angle to said third surface; said first and third surfaces being substantially parallel to one another and said second and fourth surfaces being substantially parallel to one another;

said cam stud means further comprising cam lobe means having at least three contiguous working surfaces; comprising a first radial surface; a second surface larger than said first radial surface; and a third radial surface following the second surface for engagement with the surfaces of said slot.

36. A fishing reel driven by a handle comprising:

a reel frame;

a spool spindle means mounted to be reciprocated longitudinally in said reel frame between two positions at which the direction of motion of said spool spindle means is reversed;

a fixed spool, mounted at an end of said spool spindle means and coaxially with said spool spindle means;

a rotary line recovery device mounted coaxially with said spool for guiding fishing line onto said spool;

a crankshaft connected at one end of said handle for rotation therewith;

a drive gear connected to said crankshaft for rotation therewith;

a transmission system, for longitudinally reciprocating said spool spindle means, comprising:

a transverse block connected said spool spindle to translate therewith; said transverse block having a guide slot therein;

a transverse crosswind post fixed to said frame;

a crosswind gear rotating about said transverse crosswind post;

said drive gear engaging said crosswind gear for rotating said crosswind gear upon rotation of said drive gear;

a cam stud means eccentrically mounted on the crosswind gear to rotate in a circular path about the axis of rotation of said crosswind gear;

said cam stud means positioned within said guide slot and engaging said block to displace said block and move the spool spindle means in the direction parallel to its longitudinal axis;

said block having walls forming said guide slot, comprising at least four surfaces; a first surface, a second surface at an angle to said first surface, a third surface, a fourth surface at an angle to said third surface; said first and third surfaces being substantially parallel to one another and said second and fourth surfaces being substantially parallel to one another;

said cam stud means further comprising cam lobe means having at least three contiguous surfaces; comprising a radial surface; a second surface at an angle to said radial surface; and a third surface at an angle to and following the second surface.

37. A fishing reel driven by a handle comprising:

a reel frame;

a spool spindle means mounted to be reciprocated longitudinally in said reel frame between two positions at which the direction of motion of said spool spindle means is reversed;

a fixed spool, mounted at an end of said spool spindle means and coaxially with said spool spindle means;

a rotary line recovery device mounted coaxially with said spool for guiding fishing line onto said spool;

a crankshaft connected at one end of said handle for rotation therewith;

a drive gear connected to said crankshaft for rotation therewith;

a transmission system, for longitudinally reciprocating said spool spindle means, comprising:

a transverse block connected said spool spindle means to translate therewith; said transverse block having a guide slot therein;

a transverse crosswind post fixed to said frame;

a crosswind gear rotating about said transverse crosswind post;

said drive gear engaging said crosswind gear for rotating said crosswind gear upon rotation of said drive gear;

a cam stud means eccentrically mounted on the crosswind gear to rotate in a circular path about the axis of rotation of said crosswind gear;

said cam stud means positioned within said guide slot and engaging said block to displace said block and move the spool spindle means in the direction parallel to its longitudinal axis;

said block having walls forming said guide slot, comprising at least two working surfaces; a first surface; and a second surface being substantially parallel to said first surface;

said cam stud means further comprising cam lobe means having at least three contiguous working surfaces; comprising a first radial surface; a second radial surface of a larger radius than said first radial surface; and a third radial surface following the second surface for engagement with the surfaces of said slot.

* * * * *